(12) United States Patent
Ritter et al.

(10) Patent No.: US 8,093,741 B2
(45) Date of Patent: Jan. 10, 2012

(54) METHOD AND SYSTEM FOR PROVIDING INCREASED TURBINE OUTPUT FOR DOUBLY FED INDUCTION GENERATOR

(75) Inventors: Allen Michael Ritter, Roanoke, VA (US); Jeffrey Alan Melius, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/915,116

(22) Filed: Oct. 29, 2010

(65) Prior Publication Data

US 2011/0140430 A1 Jun. 16, 2011

(51) Int. Cl.
*F03D 9/00* (2006.01)
*H02P 9/04* (2006.01)

(52) U.S. Cl. ............................................. 290/44; 322/37
(58) Field of Classification Search ................ 290/43, 290/44, 55; 322/37, 24
See application file for complete search history.

(56) References Cited

U.S. PATENT DOCUMENTS

| | | | |
|---|---|---|---|
| 7,239,036 B2 * | 7/2007 | D'Atre et al. | 290/44 |
| 7,372,174 B2 * | 5/2008 | Jones et al. | 290/44 |
| 7,411,309 B2 * | 8/2008 | Hudson | 290/44 |
| 7,423,412 B2 * | 9/2008 | Weng et al. | 322/20 |
| 7,425,771 B2 * | 9/2008 | Rivas et al. | 290/44 |
| 7,919,879 B2 * | 4/2011 | Flannery et al. | 290/44 |
| 7,978,445 B2 * | 7/2011 | Ritter | 361/18 |
| 2007/0024059 A1 | 2/2007 | D'Atre et al. | |
| 2007/0279815 A1 | 12/2007 | Li et al. | |
| 2008/0111380 A1 | 5/2008 | Delmerico et al. | |
| 2008/0291708 A1 | 11/2008 | Teichmann et al. | |
| 2009/0001940 A1 | 1/2009 | Sihler et al. | |
| 2009/0194995 A1 | 8/2009 | Delmerico et al. | |
| 2009/0278352 A1 | 11/2009 | Rivas et al. | |

OTHER PUBLICATIONS

Dynamic Reactive Power Control for Wind Power Plants, Camm et al., S&C Electric Company, 6601 N. Ridge Blvd., Chicago, IL 60626.

* cited by examiner

*Primary Examiner* — Nicholas Ponomarenko
(74) *Attorney, Agent, or Firm* — Dority & Manning, P.A.

(57) ABSTRACT

A system and method for supplying increased frequency supporting current from a doubly fed induction generator (DFIG) to assist in maintaining grid stability is provided. The output capability of a line side converter associated with the DFIG is enhanced by significantly increasing the current handling capacity of electric switches forming the converter. A dynamic brake is also provided across a DC link bus coupling the line side converter to another converter coupled to the rotor of the DFIG. The dynamic brake is controlled based on the voltage across the DC link bus.

18 Claims, 3 Drawing Sheets

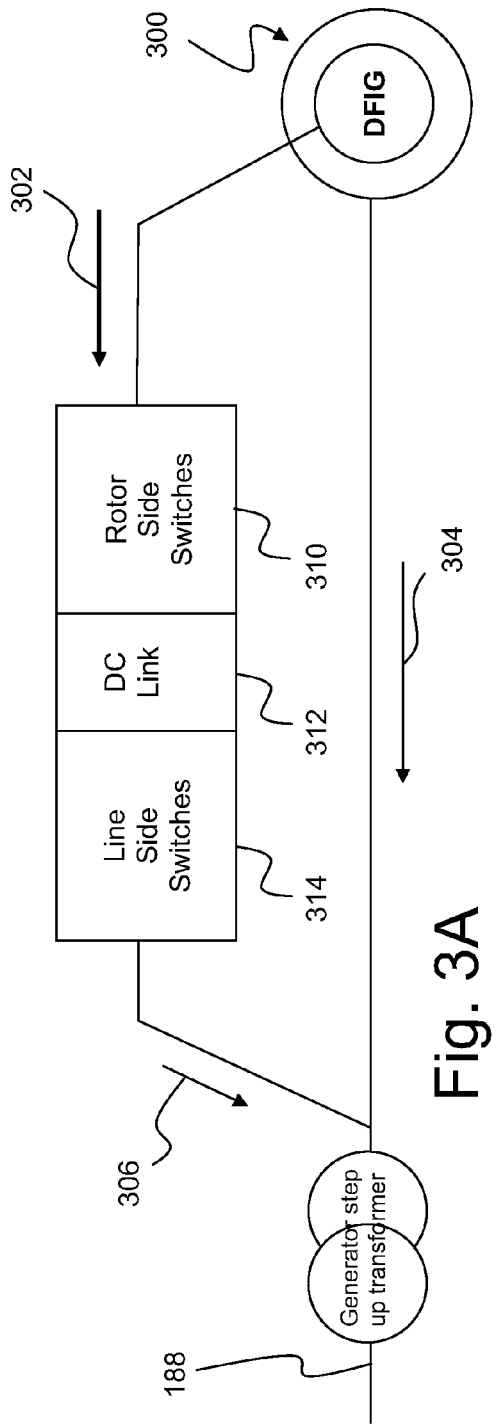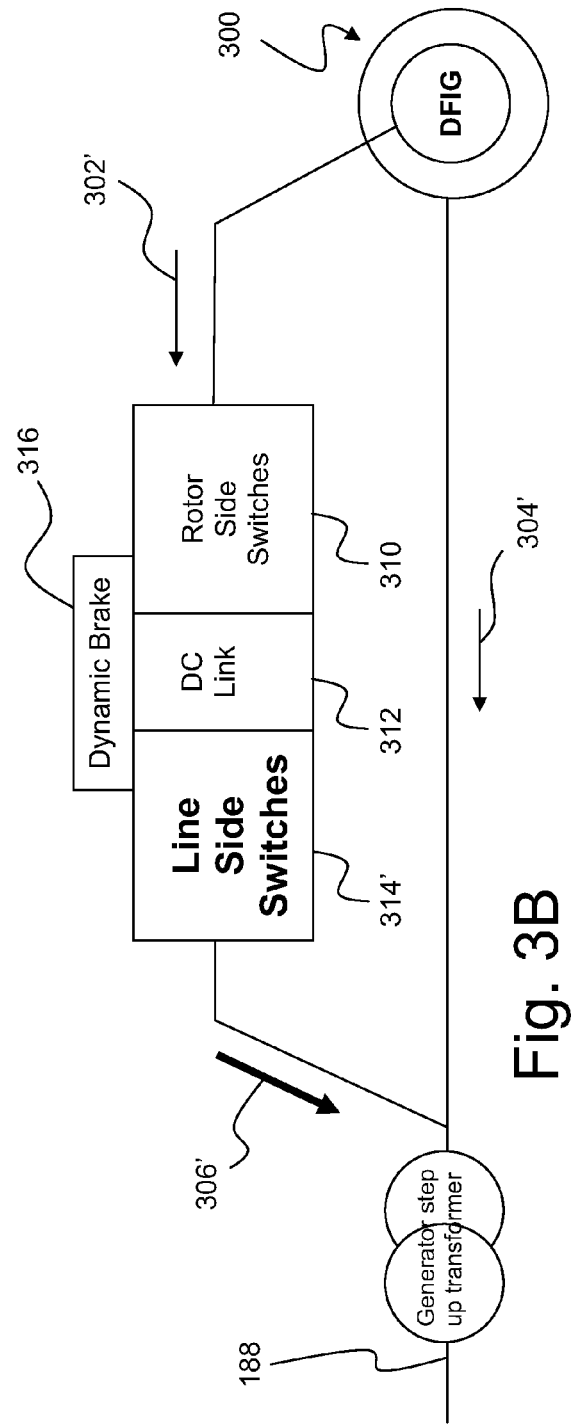

METHOD AND SYSTEM FOR PROVIDING INCREASED TURBINE OUTPUT FOR DOUBLY FED INDUCTION GENERATOR

FIELD OF THE INVENTION

The present invention relates generally to the field of wind generators, more particularly, to methods and systems to allow for an increase in generator output to supply frequency supporting current.

BACKGROUND OF THE INVENTION

Recently, wind turbines have received increased attention as an environmentally safe and relatively inexpensive alternative energy source. With this growing interest, considerable efforts have been made to develop wind turbines that are reliable and efficient.

Generally, wind turbines use the wind to generate electricity. The wind turns multiple blades connected to a rotor. The spin of the blades caused by the wind spins a shaft of the rotor, which connects to a generator that generates electricity. Specifically, the rotor is mounted within a housing or nacelle, which is positioned on top of a truss or tubular tower. Utility grade wind turbines, i.e., wind turbines designed to provide electrical power to a utility grid can have relatively large rotors ranging to thirty or more meters in diameter. Blades on these rotors transform wind energy into a rotational torque or force that drives one or more generators that, in some instances, are coupled to the rotor through a gearbox. The gearbox may be used to step up the inherently low rotational speed of the turbine rotor for the generator to efficiently convert mechanical energy to electrical energy, which is provided to a utility grid.

Some turbines utilize generators that are directly coupled to the rotor without using a gearbox. In these instances, doubly fed induction generators (DFIG) may be used. Power converters are used to transfer the power for the wound rotor of the generator to a grid connection. In operation, a required level of energy will pass through a DC link of the power converter. Under certain conditions (e.g., transient power conditions), a high power mismatch between the rotor and the grid connection temporally exists and voltage transients become amplified such that a DC link voltage level can increase above normal allowed or rated levels.

Known systems for absorbing or deflecting power during excessive power level conditions include using a fast acting shorting means, e.g., a crowbar circuit, between the rotor terminals of the doubly fed induction generator and the rotor converter. In operation, these shorting devices provide a short circuit at the rotor terminals, for example, during the excessive power level conditions, to prevent excess power flowing to the rotor converter. Excess power can result in the development of an excess DC link voltage that can damage the converter and halt the operation of the wind turbine system.

The known extra shorting devices not only add cost to the wind turbine system, but may cause high torque peaks to the generator shaft torque that excite vibrations in the coupled drive train of the wind turbine. Excessive forces must be accounted for where sudden changes of extracted power cause transient or oscillatory forces to exceed rated force or the force related displacement to exceed the rated displacement.

While the cost of providing increased strength for these components is high, the capability provided by such components can be used to increase their value. On the other hand, limits that must be placed on the operating system may reduce this value. The need for the system to provide current for grid stability may reduce the generators capability to provide frequency support where a portion of the grid stability current is supplied by the generator alone.

Thus, there is a need for a method and system to dependably supply the grid stability reactive power currents while allowing the generator to provide the frequency supporting current without need to strengthen all the turbine equipment.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a control method for stabilizing disturbances in electric grid currents in a wind turbine energized electric grid, comprising, coupling the stator of a wind driven doubly fed induction generator to the grid, coupling the rotor of the doubly fed induction generator to the grid by way of a line side converter, the line side converter comprising a plurality of current conducting electric switches, and providing the current conducting switches of the line side converter with sufficient current carrying capacity to produce frequency support and increased grid stabilizing currents while providing frequency support and requiring lesser amounts of grid stabilizing currents from the stator of the doubly fed induction generator thereby allowing for more power producing stator currents during disturbances in the electric grid.

In selected embodiments, the method also provides for coupling the rotor of the doubly fed induction generator to the line side converter by way of a rotor side converter and a direct current link, where the rotor side converter comprises a plurality of current conducting electric switches. In certain instances, the method provides the switches as solid state switches and in some instances as IGBT switches.

In more particular embodiments, the method provides for coupling a dynamic brake across the direct current link and controlling the dynamic brake in dependence on the voltage level across the direct current link. In selected embodiments, the method provides the dynamic brake as a series connected switch and a dissipative device and in particular embodiments the series connected switch is solid state switch and the dissipative device is a resistor.

In selected embodiments the method provides for controlling the dynamic brake by modulating a signal applied to the solid state switch in accordance with voltage variations across the direct current link. In more particular embodiments the method provides switches having current carrying capacity for the line side converter switches at least as great as the current carrying capacity provided for the rotor side converter switches. In some embodiments, the method provides the switches and the dynamic brake switch as insulated gate bipolar transistors.

Another exemplary embodiment of the present disclosure is directed to an apparatus for stabilizing disturbances in electric grid currents in a wind turbine energized electric grid. The apparatus includes a wind driven doubly fed induction generator having a stator and a rotor, wherein the stator is coupled to the electric grid. A line side converter is provided with a plurality of current conducting electric switches configured to couple the rotor of the doubly fed induction generator to the grid. The current conducting switches are provided with sufficient current carrying capacity to produce frequency support and increased grid stabilizing currents while providing frequency support and requiring lesser amounts of grid stabilizing currents from the stator of the doubly fed induction generator so that more power producing current may be provided from the stator during disturbances in the electric grid.

Variations and modifications can be made to these exemplary embodiments of the present disclosure. These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3A depicts frequency supporting and grid stabilizing current flows available in previous DFIG systems; and, FIG. 3B depicts frequency supporting and grid stabilizing current flows available in DFIG systems in accordance with present disclosure.

DETAILED DESCRIPTION OF THE DRAWINGS

Figure 1:
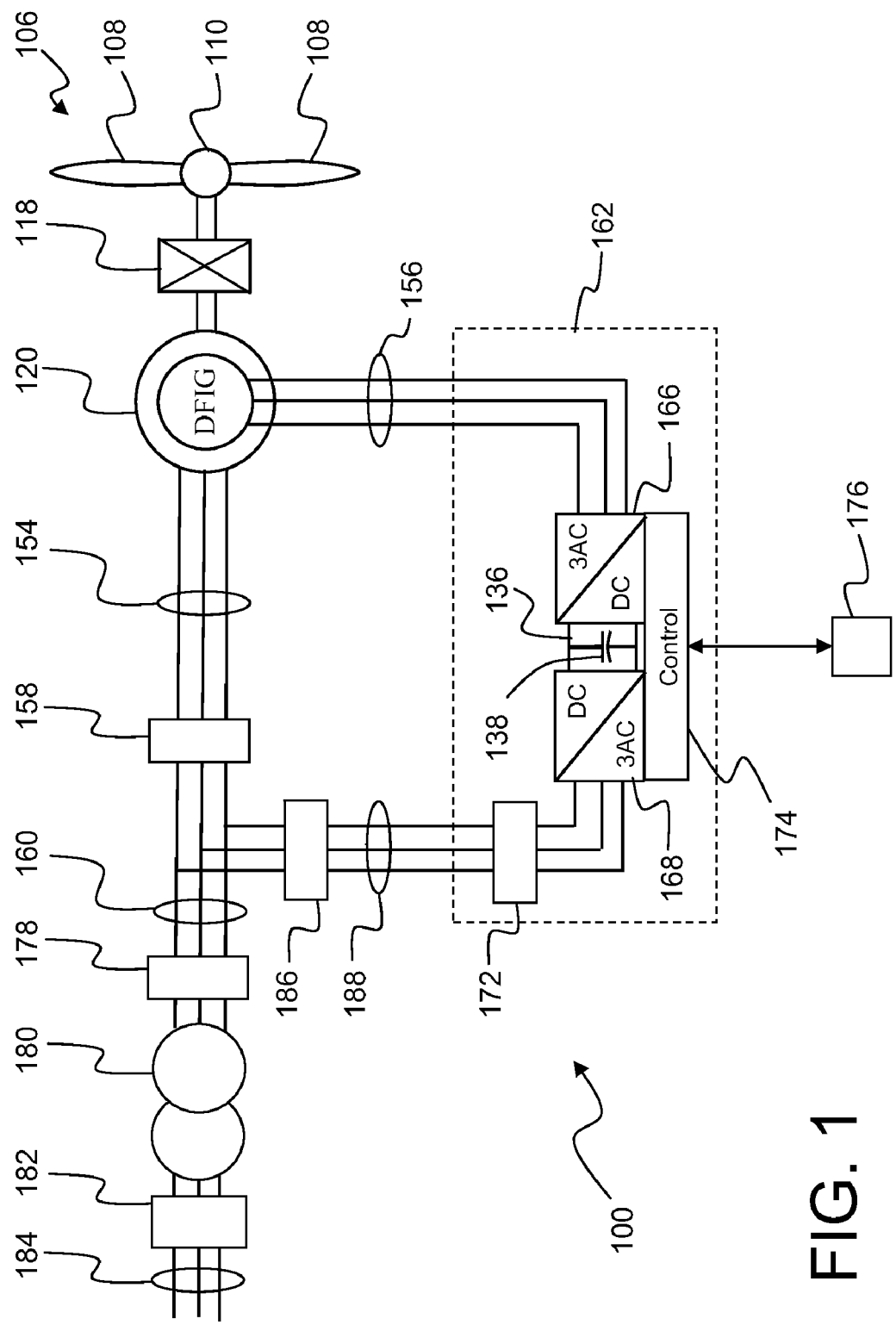
FIG. 1 depicts aspects of an exemplary control system for a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

In order to place the teachings of the current invention into context, a review of aspects of components for generating electricity using a wind turbine are now discussed. Referring to FIG. 1, there is shown an exemplary embodiment of aspects of wind turbine system 100.

In this embodiment, a rotor 106 includes a plurality of rotor blades 108 coupled to a rotating hub 110, and together define a propeller. The propeller is coupled to an optional gear box 118, which is, in turn, coupled to a generator 120. In accordance with present disclosure, generator 120 is a doubly fed induction generator 120 (DFIG).

Figure 2:
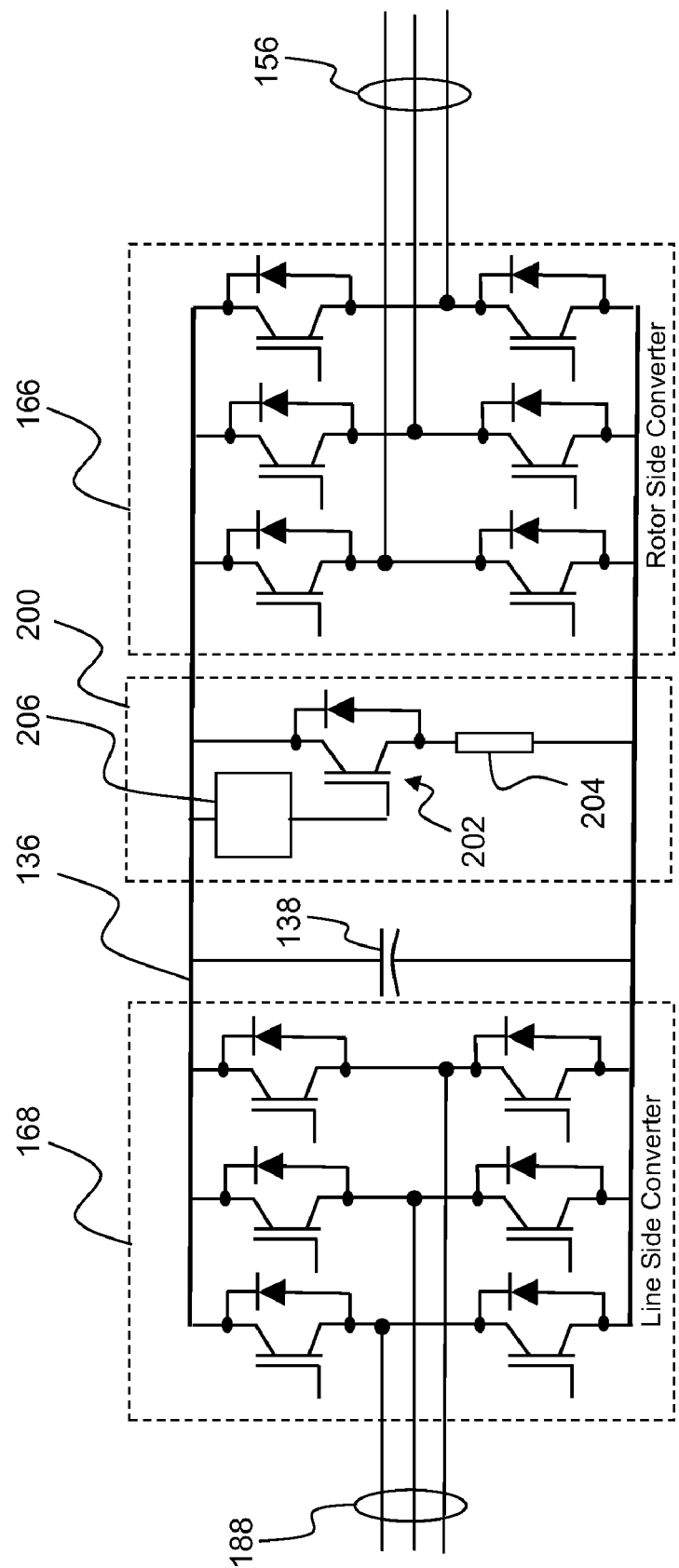
FIG. 2 depicts aspects of rotor side and line side converters and a dynamic brake in accordance with present disclosure.

DFIG 120 is typically coupled to stator bus 154 and a power conversion component 162 via a rotor bus 156. The stator bus 154 provides output of three-phase power from a stator (not separately illustrated) of DFIG 120 and the rotor bus 156 provides output of three-phase power from a rotor (not separately illustrated) of the DFIG 120. With particular reference to the power conversion component 162, DFIG 120 is coupled via the rotor bus 156 to a rotor side converter 166. The rotor side converter 166 is coupled to a line side converter 168 which in turn is coupled to line side bus 188. In exemplary configurations, the rotor side converter 166 and the line side converter 168 are configured for a normal operating mode in a three-phase, two level, Pulse Width Modulation (PWM) arrangement using Insulated Gate Bipolar Transistor (IGBT) switching devices as illustrated in FIG. 2. The rotor side converter 166 and the line side converter 168 are coupled via a DC link 136 across which is the DC link capacitor 138.

The power conversion component 162 also includes a controller 174 to control the operation of the rotor side converter 166 and the line side converter 168. It should be noted that the controller 174, in typical embodiments, is configured as an interface between the power conversion component 162 and a control system 176.

In typical configurations, various line contactors and circuit breakers including, for example, grid breaker 182 may be included to isolate the various components as necessary for normal operation of DFIG 120 during connection to and disconnection from power grid 184. A system circuit breaker 178 couples the system bus 160 to transformer 180, which is connected to power grid 184 via grid breaker 182.

In operation, power generated at DFIG 120 by the rotating rotor 106 is provided via a dual path to power grid 184. The dual paths are defined by the stator bus 154 and the rotor bus 156. On the rotor bus 156 side, sinusoidal three-phase alternating current (AC) power is converted to direct current (DC) power by the power conversion component 162. The converted power from the power conversion component 162 is combined with the power from the stator of DFIG 120 to provide three-phase power having a frequency that is maintained substantially constant, for example, at a sixty Hertz AC level. The power conversion component 162 compensates or adjusts the frequency of the three-phase power from the rotor of DFIG 120 for changes.

As is known in the art, various circuit breakers and switches within the wind turbine system 100, including grid breaker 182, system breaker 178, stator sync switch 158, converter breaker 186, and line contactor 172 are configured to connect or disconnect corresponding buses, for example, when current flow is excessive and can damage the components of the wind turbine system 100 or for other operational considerations. Additional protection components (not shown) may also be provided.

It should be noted that wind turbine system 100 may be modified to operate in connection with different power systems, etc. In general, the wind turbine system 100 generates power as is known in the art. It should also be recognized that aspects of wind turbine system 100 as discussed herein are merely illustrative and not limiting thereof.

In various embodiments, the power conversion component 162 receives control signals from, for example, the control system 176 via the controller 174. The control signals are based, among other things, on sensed conditions or operating characteristics of the wind turbine system 100. Typically, the control signals provide for control of the operation of the power conversion component 162. For example, feedback in the form of sensed speed of the DFIG 120 may be used to control the conversion of the output power from the rotor bus 156 to maintain a proper and balanced three-phase power supply. Other feedback from other sensors also may be used by the control system 174 to control the power conversion component 162, including, for example, stator and rotor bus voltages and current feedbacks. Using the various forms of feedback information, and for example, switching control signals, stator synchronizing switch control signals and system circuit breaker control (trip) signals may be generated in any known manner.

Referring now to FIG. 2, there are depicted aspects of rotor side converter 166, line side 168 converter, and dynamic brake 200 in accordance with present disclosure. As may be seen from FIG. 2, both rotor side converter 166 and line side converter 168 correspond, in this exemplary configuration, to a plurality of insulated gate bipolar transistors (IGBTs). It will be appreciated by those of ordinary skill in the art that other types of devices may be used in place of the IGBTs. The rotor side converter 166 is configured to receive AC input from rotor bus 156 and to provide a DC voltage across capacitor 138 which is coupled across DC link 136. Line side converter 168, on the other hand, is configured to convert the DC voltage on DC link 136 into an AC voltage and to supply such AC voltage to line bus 188.

In accordance with present disclosure, it has been found that by replacing the line side converter 168 switches, i.e., presently illustrated IGBT devices, with switches having at least the same current carrying capacity as the rotor side converter 166 switches and with the addition of a dynamic brake 200 coupled across DC link 136, significantly increased grid stabilizing reactive currents may be supplied during transient conditions. In the presently illustrated exemplary configuration dynamic brake 200 may correspond to IGBT 202 coupled in series with dissipative element 204. In an exemplary embodiment, dissipative element 204 may correspond to a resistor of appropriate power handling capacity and IGBT 202 may be controlled using pulse width modulation techniques via controller 206 which is responsive to voltage levels across DC link 136.

With reference now to FIG. 3A there is depicted a block diagram of frequency supporting and grid stabilizing current flows in a previously available doubly fed induction generator system (DFIG) system. As may be seen from FIG. 3A, frequency supporting and grid stabilizing currents may flow along the path represented by current path arrow 302 from the rotor of DFIG 300 and join with stator currents represented by current path arrow 304 after passing through rotor side switches 310, DC link 312, and line side switches 314.

FIG. 3B depicts frequency supporting and grid stabilizing current flows available in accordance with present disclosure. In accordance with present disclosure, previously used line side switches 314 are replaced with higher capacity line side switches 314' corresponding at least in current carrying capacity to that of the rotor side switches 310 as partly represented by the increased font size in FIG. 3B vs. that of FIG. 3A. In addition, a dynamic brake 316 is provided as previously noted with respect to FIG. 2 coupled across DC link 312. The combination of these features provides for frequency supporting and more grid stabilizing currents as represented by current path arrow 306' from the line side switches 314' and frequency supporting and less grid stabilizing currents from the stator of generator 300 as represented by current path arrow 304'. At the same time the rotor of DFIG 300 is called upon to supply frequency supporting and less grid stabilizing currents as represented by current path arrow 302'. This combination results in increased power producing stator current, i.e., increased power capability of the generator, and improved response to grid transients.

During periods of transient disturbance on grid 188, provisions must be made to compensate for the effect of reactive power. Generally wind turbines are supplied with compensation mechanisms that allow operation at near unity power factor. For example, in an exemplary DFIG systems, line side converters may be controlled via pulse width modulation techniques to produce a higher or lower voltage than the bus to which they are connected to achieve power factor correction.

In accordance with present disclosure, significantly increasing, for example by doubling, the capacity of the line side switches provides a means to provide the additional current capability of the line side converter to supply grid stabilizing current without increasing rotor or stator current. At the same time, dynamic brake 316 is operated in response to the DC link voltage using, for example, a pulse width modulation technique to control the DC link voltage to provide a generally constant relatively normal level during periods of grid instability.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for stabilizing disturbances in electric grid currents in a wind turbine energized electric grid, comprising:
    coupling the stator of a wind driven doubly fed induction generator to the grid;
    coupling the rotor of the doubly fed induction generator to the grid by way of a line side converter, the line side converter comprising a plurality of current conducting electric switches; and,
    providing the current conducting switches of the line side converter with sufficient current carrying capacity to produce frequency support and increased grid stabilizing currents while providing frequency support and requiring lesser amounts of grid stabilizing currents from the stator of the doubly fed induction generator thereby allowing for increased power producing stator current during disturbances in the electric grid.

2. The method of claim 1, further comprising coupling the rotor of the doubly fed induction generator to the line side converter by way of a rotor side converter and a direct current link, the rotor side converter comprising a plurality of current conducting electric switches.

3. The method of claim 2, further comprising:
    coupling a dynamic brake across the direct current link; and,
    controlling the dynamic brake in dependence on the voltage level across the direct current link.

4. The method of claim 3, wherein coupling a dynamic brake comprises coupling a series connected switch and a dissipative device across the direct current link.

5. The method of claim 4, wherein coupling a series connected solid state switch and a resistor across the direct current link.

6. The method of claim 5, wherein controlling the dynamic brake comprises modulating a signal applied to the solid state switch in accordance with voltage variations across the direct current link.

7. The method of claim 2, wherein the current carrying capacity provided for the line side converter switches is at least as great as the current carrying capacity provided for the rotor side converter switches.

8. The method of claim 2, wherein the plurality of current conducting electric switches in the line side converter and the plurality of current conducting electric switches in the rotor side converter are provided as insulated gate bipolar transistors.

9. The method of claim 5, wherein coupling a series connected solid state switch comprises coupling an insulated gate bipolar transistors.

10. Apparatus for stabilizing disturbances in electric grid currents in a wind turbine energized electric grid, comprising:
a wind driven doubly fed induction generator having a stator and a rotor, wherein said stator is coupled to said electric grid; and,
a line side converter, the line side converter comprising a plurality of current conducting electric switches configured to couple the rotor of said doubly fed induction generator to said grid;
wherein the current conducting switches are provided with sufficient current carrying capacity to produce frequency support and increased grid stabilizing currents while providing frequency support and requiring lesser amounts of grid stabilizing currents from the stator of the doubly fed induction generator thereby allowing for increased power producing stator current during disturbances in the electric grid.

11. The apparatus of claim 10, further comprising:
a rotor side converter, said rotor side converter comprising a plurality of current conducting electric switches; and,
a direct current link coupling said rotor side converter to said line side converter.

12. The apparatus of claim 11, further comprising:
a dynamic brake coupled across said direct current link; and,
a controller responsive to a voltage level across said direct current link coupled to the dynamic brake.

13. The apparatus of claim 12, wherein said dynamic brake comprises a series connected switch and a dissipative device coupled across the direct current link.

14. The apparatus of claim 13, wherein said series connected switch is a solid state switch and the dissipative device is a resistor.

15. The apparatus of claim 14, wherein said controller is configured to modulate a signal applied to the solid state switch in accordance with voltage variations across the direct current link.

16. The apparatus of claim 11, wherein the current carrying capacity provided for the line side converter switches is the same as the current carrying capacity provided for the rotor side converter switches.

17. The apparatus of claim 11, wherein said plurality of current conducting electric switches in the line side converter and said plurality of current conducting electric switches in the rotor side converter are insulated gate bipolar transistors.

18. The apparatus of claim 14, wherein said series connected solid state switch comprises an insulated gate bipolar transistors.

* * * * *